United States Patent [19]

Hanson et al.

[11] Patent Number: 5,315,521
[45] Date of Patent: May 24, 1994

[54] CHEMICAL PROCESS OPTIMIZATION METHOD

[75] Inventors: Thomas C. Hanson, Buffalo; Dante P. Bonaquist, Grand Island; Michael D. Jordan, Williamsville, all of N.Y.

[73] Assignee: Praxair Technology, Inc., Danbury, Conn.

[21] Appl. No.: 921,144

[22] Filed: Jul. 29, 1992

[51] Int. Cl.$^5$ .................. G06F 15/46; G05B 13/04
[52] U.S. Cl. .................. 364/468; 364/149; 364/150; 364/151; 364/501; 364/502
[58] Field of Search .......... 364/148, 149, 150, 151, 364/468, 469, 501, 502; 55/1, 210

[56] References Cited

U.S. PATENT DOCUMENTS

| | | | |
|---|---|---|---|
| 3,828,171 | 8/1974 | Griffin et al. | 364/501 |
| 4,734,114 | 3/1988 | Tasaka et al. | 62/37 |
| 4,744,028 | 5/1988 | Karmarkar | 364/402 |
| 4,778,497 | 10/1988 | Hanson et al. | 62/11 |
| 5,019,144 | 5/1991 | Victor et al. | 62/22 |

OTHER PUBLICATIONS

Refining, Supply, Distribution, and Marketing Model, J. W. Zellhart, presented at the National Petroleum Refiners Association, Nov. 8–11, 1987.
Robustness of Optimal Operation of a Steam-And-Power System, Kunugita et al. International Chemical Engineering, vol. 28, No. 1, Jan. 1988, pp. 75–83.
Optimizing a Process Plant Utility System, R. Nath and J. F. Holliday, Mechanical Engineering, Feb. 1985, pp. 44–50.
Optimizing a Process Plant Utility System, R. Nath and J. F. Holliday, Mechanical Engineering, Feb. 1985, pp. 44–50.

Primary Examiner—Jerry Smith
Assistant Examiner—Paul Gordon
Attorney, Agent, or Firm—Cornelius F. O'Brien

[57] ABSTRACT

A method for producing two or more products from a production site such as an air separation plant to satisfy a given demand for each of the products in which energy consumption and the rate of product production are correlated so that product production may be determined from a conventional mixed integer linear programming model the solution of which will provide an optimum production schedule for producing product to meet total product demand at minimum energy cost over a given time horizon.

6 Claims, 6 Drawing Sheets

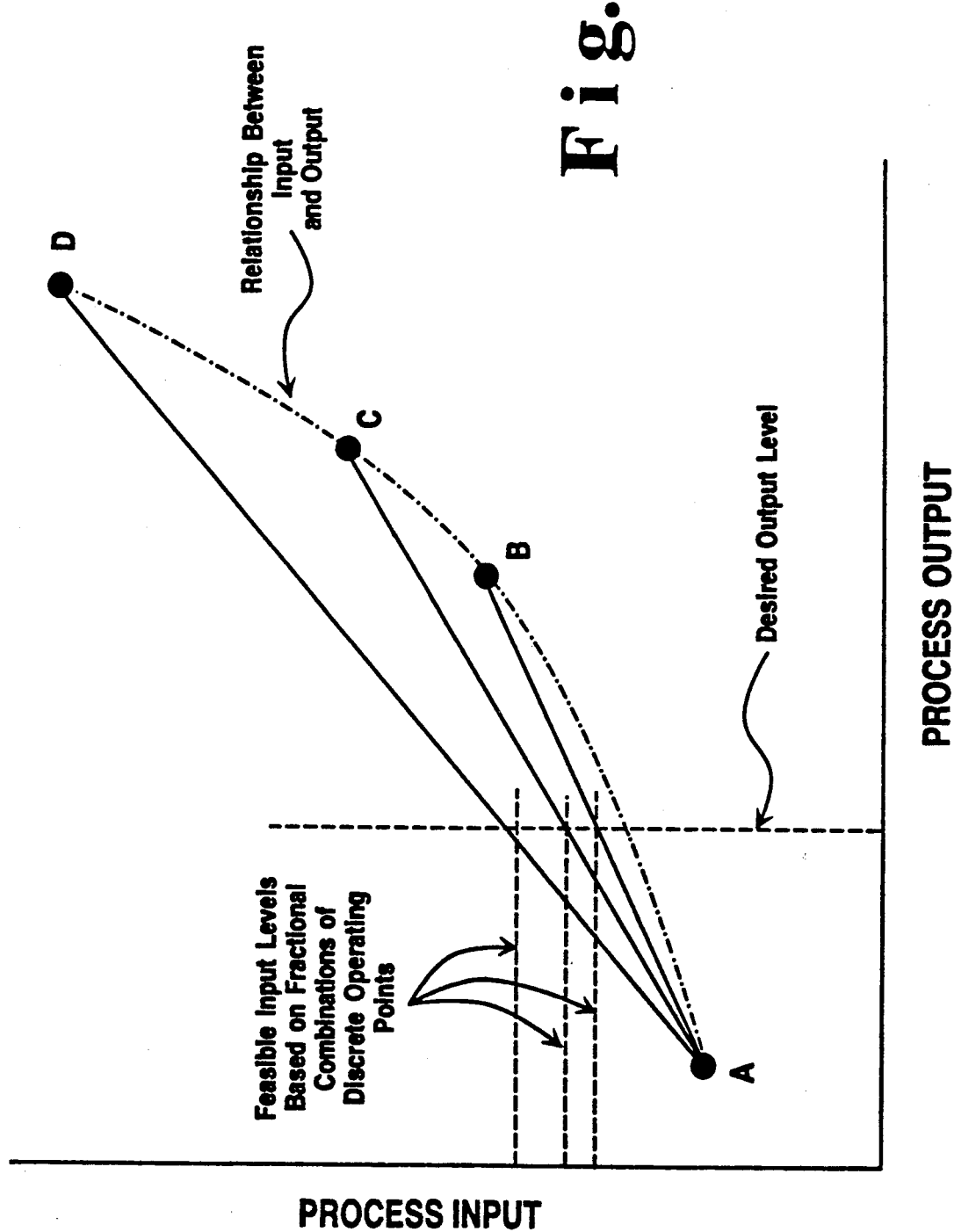

CHEMICAL PROCESS OPTIMIZATION METHOD

FIELD OF THE INVENTION

This invention relates to a method for optimizing the rate of consumption of input material and energy usage within a chemical processing plant in concert with the rate of production of output material to minimize input material and energy cost and more particularly, to a method for producing product wherein the rate of energy consumption is optimized to satisfy a given rate of product production at minimum energy cost over a predetermined time horizon during which time the cost of energy varies.

BACKGROUND OF THE INVENTION

The transformation of raw materials into product in a chemical processing plant requires the use of energy. The energy may be supplied from a utility source independent of the chemical processing plant and is usually dependent upon a contractual arrangement with the utility company. In an air separation and liquefication process plant the cost of raw material is for all practical purposes equal to the cost of electrical energy. As such, product cost will vary with the cost of electrical energy which, in turn, is dependent upon product production rate over a given time horizon and the contractual terms of purchase. Minimizing the quantity of electrical energy used to meet a desired demand for output product in a given time period will minimize production costs only if the cost of energy is a simple function of the quantity of energy used. Although it is product demand which determines how much energy is used the cost of energy is dependent upon when in time the energy is purchased and the amount of energy purchased, i.e., consumed, in that time period. In general, the cost becomes a function of how much energy is used, when it is used, and how it is used. A typical contractual feature of a utility contract is to charge the site both for total energy used and the maximum use rate taken over some contract billing period. The latter feature represents a fixed charge based on the maximum energy use rate. Under many contracts, the unit cost of energy varies discontinuously by time of day. For such contracts, there is an incentive to produce at higher levels when the energy is less expensive and reduce energy use during the times when the energy is more expensive. It is, however, necessary to account for the cost of the availability of energy independent of use. Moreover, the level of output production from an air separation plant should be held constant over any given time period in which the cost of energy is a constant unless other constraints such as the requirement to meet short term customer demands force it to be changed.

The production of a product can be limited to a single plant or it can be produced at a production site which consists of a number of interconnected plants producing common products which are combined to meet product demand. Each plant within a production site has capacity constraints, i.e., capacity limitations, and ranges defined by the physical limitations of the process equipment in the plant. The optimization of the production of a product from a production site relative to the cost of energy is independent of the distribution of the product from the production site and its optimization. Standard product allocation models exist to optimize the distribution of the products produced at the production site. A given product is produced within upper and lower limits of production rate depending upon plant equipment, the product, and the rates at which other products are made. The schedule for production of product from a production site must account for pipeline requirements and site production levels which is, in turn, dependent upon equipment constraints, ambient conditions and power availability.

SUMMARY OF THE INVENTION

The present invention is a method for producing product from an air separation and liquefication plant wherein energy consumption and the rate of product production are correlated so that product production from the plant may be readily determined by a conventional mixed integer linear programming model the solution of which will provide an optimum production schedule for producing product to meet total product demand at minimum energy cost over a given time horizon. This is accomplished in accordance with the present invention by discretizing the process operating characteristics of the plant or production site into a matrix of discrete operating points for all of the products with each operating point defined as a vector of process output rates and corresponding input rates required to achieve said output rates. The matrix of discrete operating points thus define the feasible operating space for the process plant or production site for the production of common products. Any operating point within the feasible operating space is determined in accordance with the present invention as a combination of fractions of operating points in the discrete matrix of operating points. By selecting combinations of fractions of operating points within the discrete matrix of operating points a unique feasible operating point may be determined representing a feasible product production level having a minimum requirement for energy. A single production level is selected for each cost level designated in the utility contract with the number of production levels and sequence of production levels selected to satisfy total product demand at minimal energy cost. The combination and number of selected production levels represents the optimized production schedule for the production site which is implemented manually or by an automatic supervisory controller to produce product from the site in accordance with the schedule.

The method of the present invention involves the production of at least two products from a production site necessary to meet product demand for each product within a fixed time horizon in which the rate of product production required to satisfy such demand is varied in accordance with a predetermined schedule of production levels corresponding to each of the energy cost levels to minimize the cost of electrical energy consumed at said site, with the cost of such energy dependent upon a cost structure having multiple cost levels wherein said method comprises the steps of:

formulating a process model for said production site which characterizes the operating characteristics of the production site as a functional relationship between the rate of production of each of said products from said site, including any hiatus in the production of such products, and the amount of energy consumed in the manufacture of each of said products over said time horizon with said functional relationship defining a linear or convex relationship;

identifying the process constraints in the operating characteristics of the production site which determine the limitations and boundaries in the production of said products;

selecting operating points which satisfy the process model without violating said process constraints;

limiting the selection of said operating points to a matrix of discrete operating points which identify the feasible operating space of the process;

computing any feasible operating point within the operating space as a convex combination of fractions of the operating points in the matrix of discrete operating points with each fraction representing a numerical value from zero to one inclusive;

establishing an objective function which will minimize the cost of energy for the production of said products for all feasible operating points within the defined operating space;

formulating a linear programming model based upon said objective function the solution of which will determine the minimum rate of energy use required to produce said products for any given process output level within said fixed time horizon; and solving said linear programming model.

BRIEF DESCRIPTION OF THE DRAWINGS

The advantages of the present invention will become apparent from the following detailed description of the invention when read in conjunction with the following figures of which:

FIG. 6 is a schematic illustration of the selection of feasible input levels as fractional combinations of discrete operating points for any given process output level.

DETAILED DESCRIPTION

Figure 1:
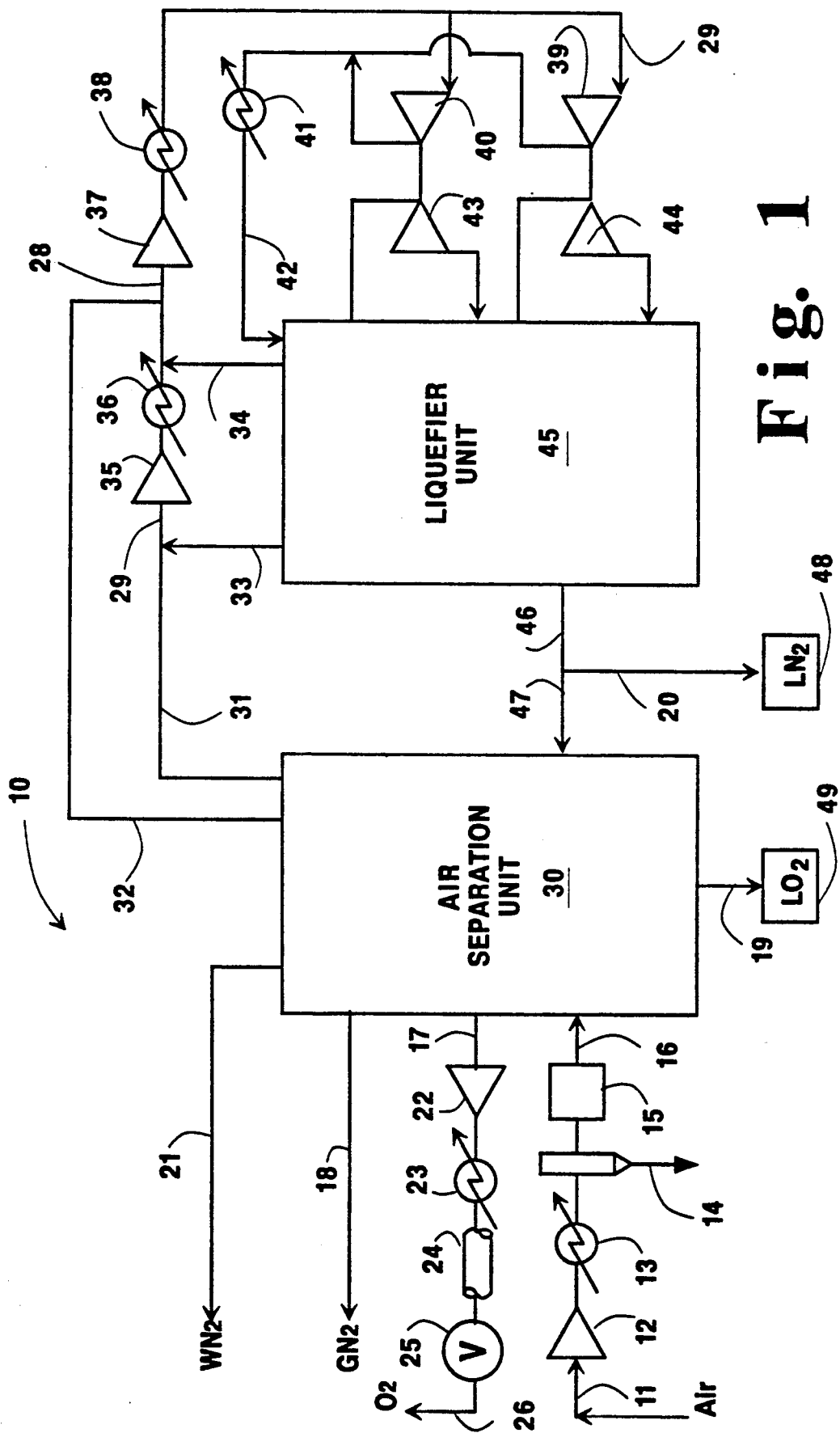
FIG. 1 is a schematic of a typical cryogenic air separation plant for producing gaseous and liquefied product.

In a cryogenic air separation plant, purified oxygen and nitrogen are produced by the cryogenic rectification of air. A typical production plant facility 10 for cryogenically producing oxygen and nitrogen as gaseous and liquefied products is schematically illustrated in FIG. 1. An air feed stream 11 is processed in the air separation plant 10 at a predetermined flow rate to produce oxygen fluid streams 17 and 19 and nitrogen fluid streams 18 and 20 at corresponding flow rates respectively.

The air feed stream 11 is compressed in compressor 12 and water cooled through heat exchanger 13 with any condensed water rejected from the feed stream at 14. The compressed feed air stream is further treated in a warm end prepurifier unit 15 to remove contaminants such as residual water vapor, carbon dioxide, and any hydrocarbons. The compressed, cooled, and cleaned feed air stream 16 then enters the air separation unit 30 where it is additionally cooled to cryogenic temperatures versus return streams and rectified using a conventional double distillation column, as is shown and described, for example, in U.S. Pat. No. 5,019,144, the disclosure of which is herein incorporated by reference. The column separation in the air separation unit 30 produces gaseous oxygen 17, gaseous nitrogen 18, and some waste e nitrogen 21. Optionally, and as is well known, the air separation unit 30 can include an argon side column to produce crude argon product which can then be further refined and liquefied to provide a liquid argon product, if desired.

An adjacent liquefier unit 45 is combined with the air separation unit 30 to produce oxygen and nitrogen liquid products. A typical liquefier unit that may be utilized for this purpose is described in U.S. Pat. No. 4,778,497, the disclosure of which is herein incorporated by reference. The liquefier unit 45 uses nitrogen fluid to develop refrigeration and to produce liquid nitrogen with some of the liquid nitrogen fed back into the columns of the air separation unit 30 to produce liquid oxygen. Low pressure nitrogen 31 from the columns in the air separation unit 30 is combined with low pressure recycle nitrogen 33 from the liquefier unit 45 for forming a low pressure stream 27 which is compressed at 35 and water cooled through the heat exchanger 36. The compressed water cooled product is combined with a medium pressure nitrogen stream 32 from the air separation unit 30 and a medium pressure nitrogen stream 34 from the liquefier unit 45 forming a single nitrogen stream 28 which is further compressed at 37 and water cooled at 38 to form a combined stream 29. The combined stream 29 is pressure boosted at 39 and at 40 and fed through the water cooled heat exchanger 41 to form a compressed nitrogen stream 42 which is fed into the liquefier unit 45 and expanded through units 43 and 44 to produce liquid nitrogen 46 and recycle nitrogen gas streams 33 and 34 respectively. A portion 20 of the liquid nitrogen 46 is recovered as a product liquid 48 whereas another porion 47 is added to the columns in air separator unit 30. Within the air separator unit 30, refrigeration of the liquid nitrogen is exchanged to allow production of liquid oxygen product 19 and gaseous oxygen 17. The liquid oxygen 19 is stored as liquid oxygen product 49.

The production facility 10 produces products stored as liquid nitrogen 48 and liquid oxygen 49 and gaseous products such as the nitrogen gas stream 18 and the oxygen gas stream 17. The gaseous products may be utilized directly or stored in a Pipeline reservoir. The oxygen stream 17 e.g. may be compressed at 22, water cooled at 23, and passed into a gas pipeline or storage reservoir 24 as product oxygen 26. Product oxygen 26 can be supplied to a customer by controlling the gas flow 25 from the pipeline or reservoir 24. It is important for this invention that the production facility incorporate at least some storage capability for the products such that production rate and customer demand do not have to match one another.

Figure 2:
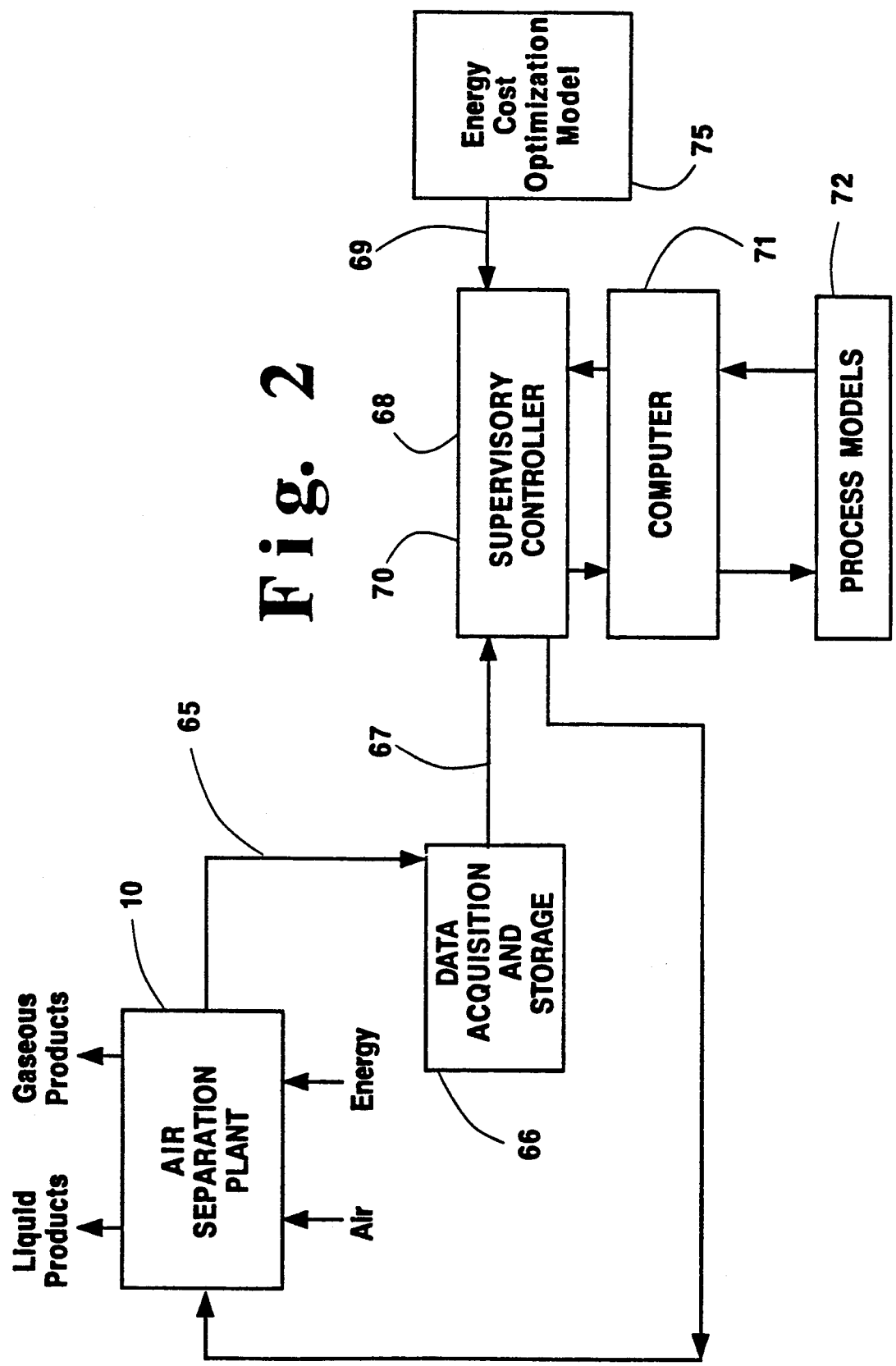
FIG. 2 is a block diagram illustration of the process of the present invention in conjunction with the overall control of an air separation and liquification plant.

An embodiment of the control process of the present invention is schematically illustrated in FIG. 2 for controlling the rates of production of output product from a cryogenic air separation plant 10; albeit, any chemical production facility may be controlled in accordance with the control process of the present invention which produces product at a rate which is decoupled, at least in the short term, from immediate customer demands and which is dependent upon electrical energy supplied from a utility company under a contractual arrangement at variable cost. The air separation plant 10 may represent one or more individual chemical plants which produce common product and operate conjointly, i.e., their output products may be combined to satisfy total output produce demand (hereafter referred to as a production site). The production rate of product from the production site 10 is varied to satisfy total product demand over a time period, hereafter referred to as a time horizon, which corresponds to a predetermined calendar time interval of hours, days, weeks or months of process plant operation. The production of any type of product may be controlled in accordance with the present invention when product cost is substantially based upon the cost of electrical energy and the rate of product production may be varied independent of the level of demand, i.e. overproduction or underproduction may be used as a control to optimize production cost. An inventory of liquid product may be stored in a storage tank whereas the storage capacity of gas in a large pipeline is varied by changing gas pressure.

The operation of the production site 10 is monitored to provide data 65 representative of various process measurements or process parameters referred to as controlled and manipulated variables such as flow rates, pressures, temperatures, liquid levels, output purity levels, energy consumption and product production rate for each of the products produced at the site 10. A controlled variable is a process variable targeted to be maintained at a desired set point whereas manipulated variables are process variables which may be adjusted to drive the controlled variables to their target or set point values. The values of the controlled and manipulated variables define the current state of the process at any given time and are stored in the data acquisition section 66 of a computer which of itself is conventional and does not form a part of the present invention. Selected data 67 corresponding to the instantaneous current state of the process may be called up at any time by the supervisory controller 70. Any of the parameters of the process may be targeted as a controlled variable to be maintained at a desired set point or changed to a new set point.

The set points and constraints are provided as inputs 68 and 69 to the controller 70 and represent the controlled variable values which are either targeted or constrained by the controller 70 in the operation of the production site 10. The inputs 69 represent energy cost related set points and constraints such as desired production levels and energy use constraints whereas the inputs 68 may include product purity levels for the cryogenic product streams and some product production rate. The production site operates under constraints such as temperature, pressure, energy consumption and energy availability and product flow rate all of which place limits on site production and must be accounted for during control of the process. These may be physical constraints which are dependent upon, for example, a maximum pressure rating that cannot be exceeded or load limitations on motors, compressors, etc. In addition, valves cannot be more than completely open or less than completely closed. The cumulative result of such constraints is a net capacity constraint on the production site 10. The energy use rate is governed by a contractual energy commitment imposed by a utility company. An energy cost optimization model 75 provides a schedule of set point values corresponding to the output production rate for each of the products from the chemical production site 10 subject to the energy use rate constraints so as to minimize the cost of energy used over a given time horizon to satisfy total product demand over such time horizon.

The set point values 68 and 69 are inputs to the supervisory controller 70 for making automatic adjustments to the manipulated variables in the production site 10 based upon comparison with data 67 to achieve the desired set point values 68 and 69. Alternatively, an operator can manually adjust manipulated variables at the production site 10 to achieve the set point values. The supervisory controller 70 is operated under the guidance of a computer 71 which, in turn, computes the set point values 73 for controlling final control elements (not shown) in plant 10 and/or for controlling subordinate controllers (not shown) in plant 10 from models which mathematically define the relationship between future changes of controlled variables and the present or current value of manipulated variables. The combination of the computer 71 and controller 70 is sometimes referred to as a model based controller. Process models 72 supply the aforementioned models to the computer 71. Two examples of a model based control of a chemical production site known as dynamic matrix control are taught in U.S. Pat. No. 4,349,869 and in U.S. Pat. No. 4,616,308 respectively. A more preferred method of dynamic matrix control using linear programming models to implement the process is taught in a companion patent application, U.S. Ser. No. 07/899,477 filed on Jun. 30, 1992, in the name of Bonaquist, et al. and entitled two-phase method for real time process control the disclosure of which is herein incorporated by reference.

Figure 3:
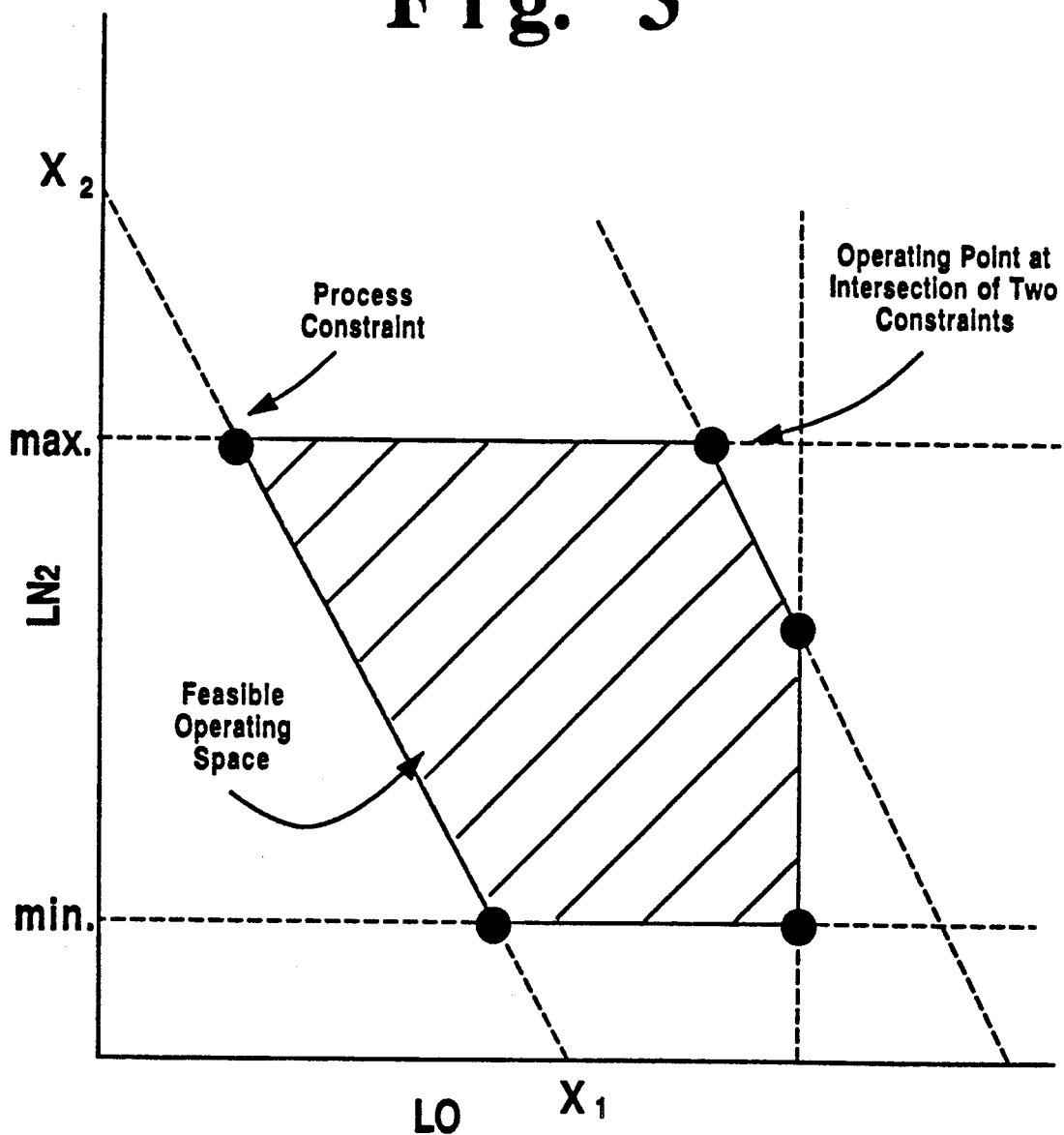
FIG. 3 is a two dimensional map of the operating characteristic of an air separation plant showing the relationship between the consumption of energy in kilowatts (Kw) and product output for liquid nitrogen and liquid oxygen.
Figure 4:
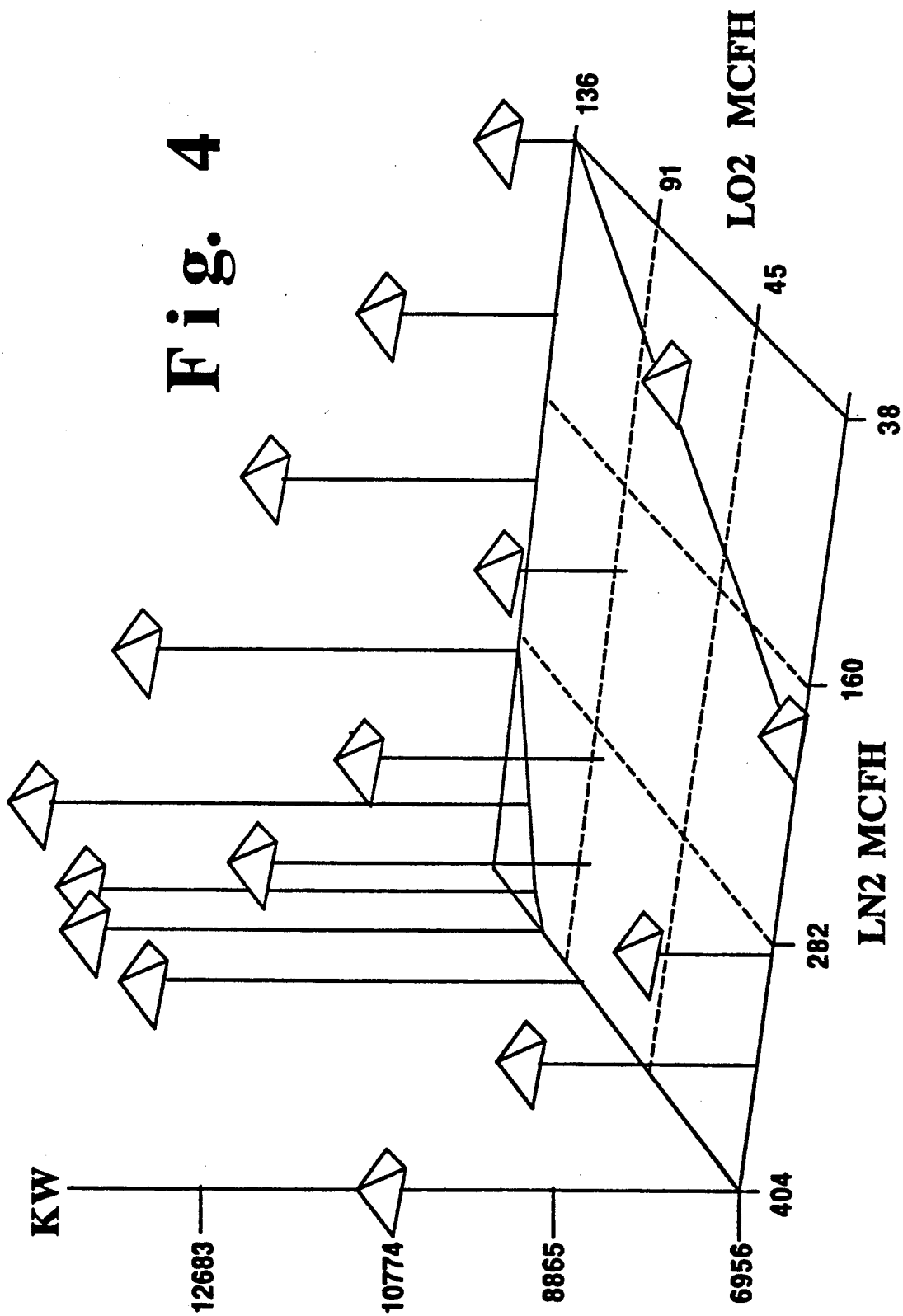
FIG. 4 is a three dimensional topographical map for an air separation plant which produces liquid nitrogen, oxygen and argon.

Data from the production site 10 corresponds to the process measurement values inclusive of all of the controlled and manipulated variables and includes production output rates for each product stream and energy use rates. The data is stored in memory in the data acquisition and storage system 66. The relationship between production rate for each cryogenic product from the production site 10 and rate of consumption of energy when graphically plotted defines a configuration representing the "feasible operating space" for the production site 10. Programs to implement the mapping of two or three dimensional graphical models of the configuration of the site 10 are generally referred to as mapping programs. A two dimensional map of a cryogenic air separation plant is shown in FIG. 3 and a three dimensional topographical map is shown in FIG. 4. Any point in the graph defines a production level of the plant corresponding to a specific liquid oxygen (LOX) rate of production and a specific liquid nitrogen (LN2) rate of production for a given energy (kw) consumption use rate. Thus the feasible operating space of the production site 10 can be considered as being a geometrical space having a surface configuration which define the limits within which the production rates of all products may be continuously varied. The configuration has surface boundaries which can be defined by of a mathematical relationship between the production rate of each product and energy consumption required to produce the product. As such, the geometrical boundaries of the configuration as indicated, e.g., in FIGS. 3 or 4, may be used to mathematically define the feasible operating space for the site 10. In FIG. 3 the enlarged black dots at the points of intersection define boundary conditions of the site since they represent maximum and minimum production rates for the product streams. Since liquid oxygen and liquid nitrogen are produced simultaneously, the joint production of product will result in a constraint which also limits the feasible operating space of the site 10. The slanted lines 5 in FIG. 3 identify joint production constraints which result in operating points between the maximum and minimum production levels. An operating point may be defined mathematically as a vector of process output rates and corresponding input energy rates required to achieve the output rates.

A process model for the production site 10 is the first step necessary to define the relationship between any process input value of, for example, energy consumption as a convex or linear function or combinations of convex or linear functions of the rate of production of an output product. Mathematically a process model for any process input $y_j$ may be represented as follows:

$$y_j = f_j(x) \vee j \qquad (101)$$

where

- $y_j$ = process input such as the flow rate of a raw material or energy use rate
- $x$ = vector of process outputs including elements such as the flow rate of products
- $f_j$ = convex or linear function whose first derivative with respect to any elements of x need not be continuous For the purposes of this invention, a convex function is defined as follows:

$$\sum_{i=1}^{I} \lambda_i f_j(x_i) \geq f_j\left(\sum_{i=1}^{I} \lambda_i x_i\right) \qquad (102)$$

$$\sum_{i=1}^{I} \lambda_i = 1.0 \qquad (103)$$

$$0 \leq \lambda_i \leq 1.0 \qquad (104)$$

The method for arriving at the form of the process model itself is not part of the subject invention and those familiar with the practices of process optimization will recognize that the process model may take on any number of forms including:

1. Rigorous flowsheet computer simulation models used for design and optimizing certain process characteristics.
2. Closed form computer models which can be simplifications of flowsheet simulation models or that can be obtained by correlation of process operating data.
3. So called black box model computer routines that when given values for the process outputs, will compute the optimum value of the process inputs.

In general, these models can include nonlinear relationships involving any number of variables as long as the composite of the relationships is linear or convex. The composite of the relationships is defined as the ultimate relationship between the process outputs and inputs.

As stated earlier, the feasible operating space for the production site 10 is the space in which the site may be operated continuously limited by all of the process constraints taken collectively. The constraints for the process model can be determined by any number of methods, including the following:

1. Component specifications representing the reliable and safe operating range of the components used in the process; e.g., an electric motor may have a limit on the electric current supplied to the motor representing a constraint on the work available from the motor.
2. A process plant in the production site or certain components in the plant are known to perform poorly outside of certain operating ranges thus defining constraints for the operation of the entire site.
3. The site is tested to identify its process constraints.
4. The process constraints are predicted using computer process simulation models.

As a practical matter, it is often desirable to include the process constraints in the computer routines used as the process models. For example, the so called black box computer routines often include additional routines required to define process constraints. However, the process constraints may also be defined in separate computer routines so that it would be possible to determine if given values of process outputs are feasible before evaluating the process model to determine the corresponding values of process inputs. The process constraints are hereafter represented in mathematical form by equations 105 and 106 respectively.

$$g_k(x) \leq UB_k \vee k \qquad (105)$$

$$h_n(x) \leq LB_n \vee n \qquad (106)$$

where:

- $g_k$ = concave or linear function whose first derivative with respect to any element of x need not be continuous
- $h_n$ = convex or linear function whose first derivative with respect to any element of x need not be continuous
- $UB_k$ = upper bound on the function $g_k$
- $LB_n$ = lower bound on the function $h_n$ For the purposes of this invention, a concave function is defined as follows:

$$\sum_{i=1}^{I} \lambda_i g_k(x_i) \leq g_k\left(\sum_{i=1}^{I} \lambda_i(x_i)\right) \qquad (107)$$

$$\sum_{i=1}^{I} \lambda_i = 1.0 \qquad (108)$$

$$0 \leq \lambda_i \leq 1.0 \qquad (109)$$

Figure 5:
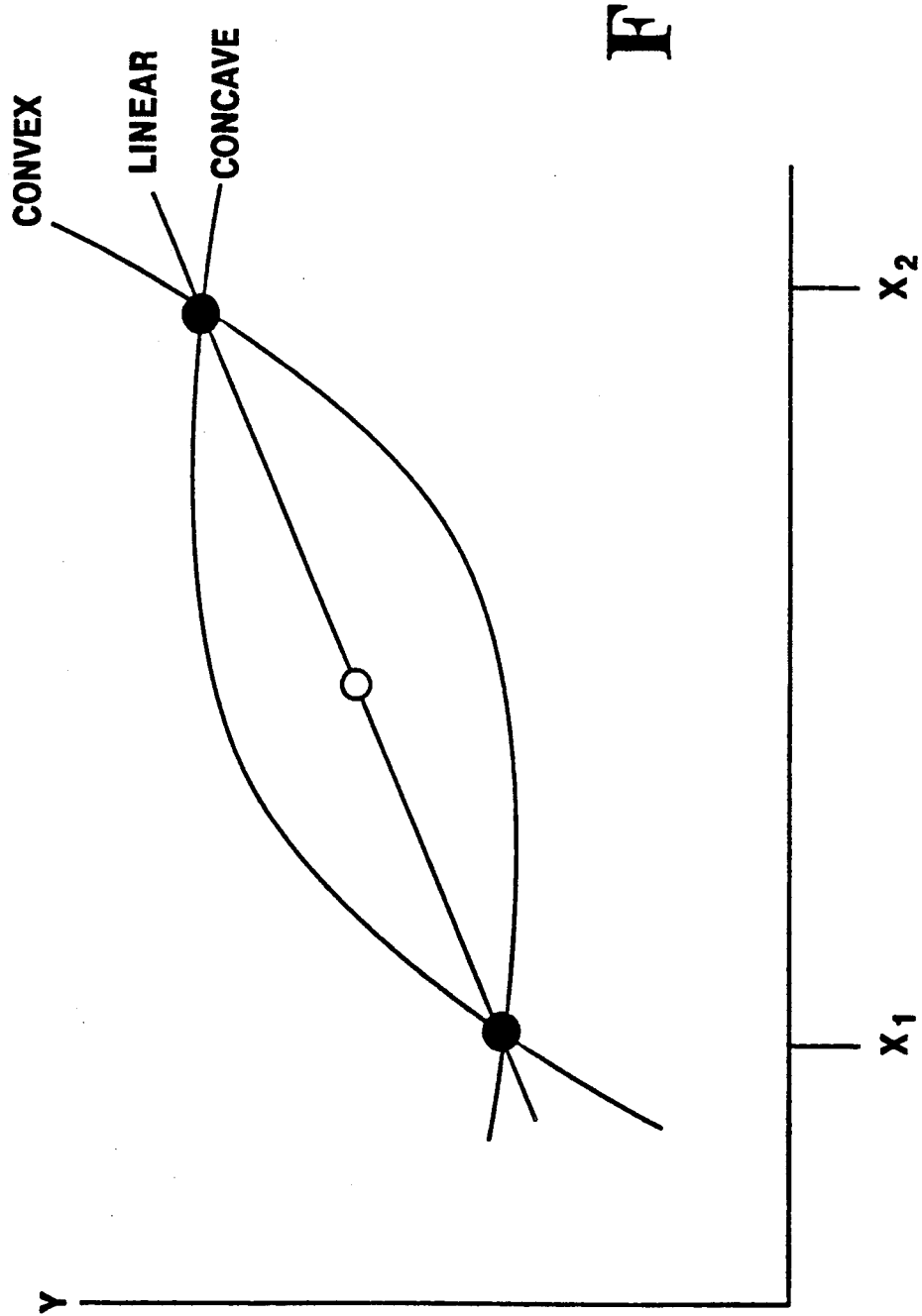
FIG. 5 graphically illustrates convex, linear and concave functions.

FIG. 5 graphically illustrates a convex, linear and concave function.

The feasible operating space of the production site 10 may be established in accordance with the present invention by the selection of a predetermined limited number of operating points hereinafter referred to as a matrix of discrete operating points limited to as few in number as required to accurately reproduce the constraints and relationships implicitly or explicitly defined in the process model and process constraints. An operating point is said to be feasible if all constraints defined by equations 105 and 106 are not violated. The feasible operating space illustrated in FIG. 3 may be defined by a matrix of discrete operating points including linear constraints and at least the operating points located at the intersection of its linear boundary constraints. Any number of techniques can be used to select the discrete operating points which must be included in the matrix of discrete operating points to represent all of the process constraints. One method involves the application of systematic search techniques such as multidimensional searching in an iterative procedure to search for discrete operating points at constraint intersections and on constraint boundaries. The search procedure efficiently selects process output vector values which are to be evaluated for feasibility using the process model and process constraint computer routines described earlier. The search procedure itself is not part of the invention. The search procedure determines the proximity of a given operating point to a constraint boundary or intersection of constraints and incorporates criteria for including the operating point in the matrix.

The preferred form of the matrix of discrete operating points will contain at least those operating points necessary to define the feasible operating space based on predefined accuracy criteria. Typically, it is desired to have the degree of overlap between the feasible operating space defined by the matrix of discrete discrete operating points and that defined by the process model and process constraints to be between 99% and 101% of the feasible operating space defined by the process model and process constraints.

The second function of the matrix of discrete operating points is to capture the complex relationships between the process outputs and inputs. If these relationships are linear, it is not necessary to include any additional points in the matrix over those required to define the feasible operating space. If the relationships are nonlinear or have discontinuous first derivatives or both, additional points will be required to improve the accuracy of the matrix.

Typically, the same multidimensional search procedure used to defined the feasible operating space can be applied to locate first derivative discontinuities and add the discrete operating points necessary to define them. In addition to the multidimensional search procedure, evaluation of process input vectors selected randomly or using a uniform grid may be employed to identify nonlinearities and cause more operating points to be included in the matrix. Suitable nonlinearity criteria are necessary to minimize the number of points included in the matrix. Typically, additional points will be included to prevent the deviation between the process outputs determined by the process models, process constraints and those process outputs determined by taking a convex combination of discrete operating points from the matrix from exceeding 0.5% of the process outputs determined by the process models and constraints for a given process input vector. The matrix of discrete operating points may be computed from archived data stored in the data acquisition system or from the process models developed from the archived data or from experimental models used to identify the process constraints inclusive of both explicit linear constraints and implicit constraints based on using a search procedure to search for discrete operating points at constraint intersections.

Once the matrix of discrete operating points is determined, any feasible point of operation in the discrete matrix of operating points can be mathematically defined as follows.

$$Z_{cc} = \lambda_i Z_i \tag{110}$$

$$\sum_{i=1}^{I} \lambda_i \leq 1.0 \tag{111}$$

$$0 \leq \lambda_i \leq 1.0 \tag{112}$$

Where:
$Z_{cc}$—feasible operating point which is a vector of process outputs and corresponding process inputs defined as a combination of fractions of operating points in the matrix of discrete operating points.
$Z_i$—feasible operating point in the matrix of discrete operating points.

The mathematical definition of a feasible point of operation as given by the above equations (110), (111) and (112) can provide a unique point of operation with respect to the process outputs but will not necessarily provide a unique point of operation with respect to the process inputs. To obtain a point of operation which will be feasible for both process inputs and process outputs it must be computed as a convex combination of fractions of operating points in the matrix of discrete operating points.

FIG. 6 illustrates for a given process output level, feasible input levels based on fractional combinations of discrete operating points A, B, C and D. The desired output level taken together with each of the feasible input levels represent points of operation which will be feasible for both process inputs and process outputs. A unique input level for a given output level can be determined by solving a linear programming model where the objective function to be minimized is a weighted combination of process inputs required to satisfy the desired process outputs.

Let the matrix of discrete operating points be represented as follows:

$$Z_i = (y_1, y_2, y_3 \ldots y_j, x_1, x_2, x_3 \ldots x_m) \text{ } i \text{ for all } i$$

where
$y_j$ = process inputs
$x_m$ = process outputs
A feasible point of operation is then represented as $$Z_{cc} = (y_1, y_2, y_3 \ldots y_j, x_1, x_2, x_3 \ldots x_m)_{cc}$$

A linear programming model which permits energy costs to be minimized for any feasible point of operation may be expressed as follows:

$$\text{Minimize } \sum_{j=1}^{J} C_j y_{j,cc} \tag{115}$$

$$\text{Subject to: } y_{j,cc} = \sum_{i=1}^{I} \lambda_i y_{j,i} \text{ for all } j \tag{116}$$

$$x_{m,cc} = \sum_{i=1}^{I} \lambda_i x_{m,i} \text{ for all } m \tag{117}$$

$$\sum_{i=1}^{I} \lambda_1 \leq 1.0 \tag{119}$$

$$0 \leq \lambda_i \leq 1.0 \text{ for all } i$$

where:
$C_j$—cost placed on process input j
$X_{m,cc}$—known values of process outputs
All linear programming models can be represented by algorithms in the form of algebraic equations defining objective functions such as equation 115 and constraint relationships such as the relationships represented by algebraic equations 116, 117, 118 and 119 respectively. A linear programming model given by objective function 115 and constraints 116, 117, 118 and 119 may be solved by converting it to a matrix form such as the MPS (Mathematical Programming System) Form which has been adopted as a base standard by mathematical programming practitioners. Conversion to the MPS Form allows the linear programming model to be read by a variety of commercial linear programming systems. This conversion can readily be accomplished by any computer program written for this purpose and as such is not a part of the present invention. The linear programming model may also be solved using any number of commercial software systems which employ the simplex or dual simplex method or other suitable algorithm for solution of linear programming models. The solution of the linear programming model represented by objective function 115 and the constraints 116, 117, 118 and 119 is a first embodiment of the present invention which, of itself, need not be independently solved if a second linear programming planning model is constructed to minimize all energy cost levels incorporating the first linear programming model as will be hereafter described.

The solution of the above linear programming model is used directly to determine the minimum rate of energy use required to produce at an operating point defined by given process outputs. This information is useful for monitoring and optimizing of process and equipment performance, which is a prerequisite to minimizing the cost of energy required to produce certain quantities of product over a specified time horizon. For minimization of energy cost it is preferable to construct a linear programming planning model which will permit energy cost to be minimized for all energy cost levels which incorporates the linear programming model of equations 115, 116, 117, 118 and 119 as follows:

$$\text{minimize } OBJ = \sum_{i=1}^{I} \sum_{j=1}^{J} X_{i,j} A_i B_j + \sum_{j=1}^{J} XS_j(KWDOWN)B_j \quad (120)$$

$$\text{subject to: } \sum_{i=1}^{I} X_{i,j} + XS_j = H_j \text{ for all } j \quad (121)$$

$$\sum_{i=1}^{I} \sum_{j=1}^{J} X_{i,j} PR_{i,k} > V_k \text{ for all } k \quad (122)$$

$$XSTOT = \sum_{j=1}^{J} XS_j \quad (123)$$

$$XS_j - RAT_j(XSTOT) = 0 \text{ for all } j \quad (124)$$
$$XS_j - DELS_j(XMINS) \geq 0 \text{ for all } j \quad (125)$$
$$XS_j - DELS_j H_j \leq 0 \text{ for all } j \quad (126)$$

Where:
I = set of discrete operating points in the matrix i = 1, 2, 3, ... |I|
J = set of energy cost levels j = 1, 2, 3 ... |J|
K = set of process products k = 1, 2, 3 ... |K|
$A_i$ = energy use rate in kilowatt-hours per hour for discrete operating point i
$B_j$ = cost for one kilowatt-hour of energy during energy cost level j in KWH
$H_j$ = number of hours available during energy cost level j
$V_k$ = total number of units of process product k required for time period THOURS = total number of hours available in time period
XMINS = minimum number of hours process plant can be shut down
KWDOWN = energy use rate in kilowatt-hours per hour for the process plant when it is shut down
$RAT_j$ = fraction of total hours available during energy cost level j $RAT_j = H_j/THOURS$
$X_{i,j}$ = activity in hours for operating point i during energy cost level j
$XS_j$ = activity in hours for shutdown
$DELS_j$ = binary variable equal to 0 if the process plant is not shut down anytime during energy cost level j and equal to 1 if the process plant is shutdown anytime during energy cost level j
$PR_{i,k}$ = production rate of process output product k in operating point i The solution of the linear programming model defined by the objective function equation (120) and the constraints 121, 122, 123, 124, 125 and 126 may then be utilized to compute production levels for each of the energy cost levels in a utility contract. The production levels are combinations of fractions of feasible operating points within the matrix of discrete operating points and may be computed as follows:

$$KW_j = \frac{\sum_{i=1}^{} X_{i,j} A_i}{(H_j - XS_j)} \quad (127)$$

$$P_{j,k} = \frac{\sum_{i=1}^{} X_{i,j} PR_{i,k}}{(H_j - XS_j)} \quad (128)$$

$KW_j$ = energy use rate in kilowatt-hours per hour during energy cost level j
$P_{j,k}$ = production rate of process product k in units per hour during energy cost level j The following example is illustrative of the invention.

EXAMPLE

Example: Minimize the cost of energy required to product 75,000 units of liquid oxygen and 250,000 units of liquid nitrogen during a period of 720 hours. Energy is available at a cost of 0.01$/KWH (level 1) for 368 hours of this period, 0.02$/KWH (level 2) for 132 hours and 0.03$/KWH (level 3) for 220 hours. KWH-kilowatt-hours.

For this example, the matrix of discrete operating points is given below. Liquid oxygen production rate in units per hour and liquid nitrogen production rate in units per hour, LOX and LIN, are process outputs. The rate of energy use in kilowatt-hours per hour, KW, is a process input. The process plant may operate at any point defined by a convex combination of points in the matrix or it may be shut down. When shut down, the process plant produces no liquid oxygen or nitrogen but uses energy at the rate of 300 kilowatt-hours per hour.

| i | KW | LOX | LIN |
|---|-------|-----|-----|
| 1 | 7726  | 49  | 233 |
| 2 | 12394 | 107 | 415 |
| 3 | 7419  | 0   | 260 |
| 4 | 12518 | 84  | 439 |
| 5 | 7279  | 24  | 233 |
| 6 | 9381  | 0   | 350 |
| 7 | 11231 | 0   | 440 |
| 8 | 7283  | 49  | 206 |
| 9 | 7728  | 49  | 234 |

-continued

| i | KW | LOX | LIN |
|---|-----|-----|-----|
| 10 | 9206 | 49 | 302 |
| 11 | 10607 | 49 | 371 |
| 12 | 11979 | 49 | 440 |
| 13 | 8343 | 115 | 123 |
| 14 | 8934 | 115 | 217 |
| 15 | 11211 | 115 | 311 |
| 16 | 12514 | 115 | 405 |

For this example, the goal of the planning model is to define an operating point corresponding to each of the three costs levels for energy and to determine if the process plant is to be shut down for some of the 720 hour time period. If the plant is shut down, it must be shut down for at least 24 hours and the shut down hours must include hours from each of the cost levels for energy in the ratio defined by the total number of hours available at a given cost level to the total number of hours in the period.

The model defined by 120, 121, 122, 123, 124, 125 and 126 is readily solved by converting it to a matrix form such as the MPS form and solving it using any number of commercial software which employ methods suitable for solving linear programming models with binary variables.

The solution of the example model is as follows:

| COLUMN | ACTIVITY |
|--------|----------|
| OBJ | 135111.28 |
| $X_{8,3}$ | 118.182 |
| $X_{13,3}$ | 64.120 |
| $X_{16,1}$ | 368.000 |
| $X_{16,2}$ | 132.000 |
| $X_{16,3}$ | 37.698 |

| Energy Cost Level | KW | P (LOX) | P (LIN) |
|-------------------|-------|---------|---------|
| 1 | 12514 | 115.0 | 405.0 |
| 2 | 12514 | 115.0 | 405.0 |
| 3 | 8488 | 79.545 | 215.909 |

We claim:

1. A method for producing at least two products from a production site to satisfy a given product demand for each of said products within a fixed time horizon in which the rate of product production required to satisfy such demand is correlated to energy consumption and varied in accordance with a predetermined schedule of production to minimize the cost of electrical energy consumed at said site, with the cost of such energy dependent upon a cost structure having multiple costs levels and wherein said predetermine schedule of production is formulated to correspond to a number of energy cost levels; comprising the steps of:

formulating a process model for said production site which characterizes the operating characteristics of the production site as a functional relationship between the rate of production of each of said products from said site, including any hiatus in the production of such products, and the amount of energy consumed in the manufacture of each of said products over said time horizon with said functional relationship defining a linear or convex relationship;

identifying the process constraints in the operating characteristics of the production site which determine the limitations and boundaries in the production of said products;

selecting operating points which satisfy the process model without violating said process constraints;

limiting the selection of said operating points to a matrix of discrete operating points which identify the feasible operating space of the process;

computing any feasible operating point within the operating space as a convex combination of fractions of the operating points in the matrix of discrete operating points with each fraction representing a numerical value from zero to one inclusive;

establishing an objective function which will minimize the cost of energy for the production of said products for all feasible operating points within the defined operating space;

formulating a linear programming model based upon said objective function the solution of which will determine the minimum rate of energy use required to produce said products for any given process output level within said fixed time horizon;

solving said linear programming model; and operating the said production site to produce the said products based on the solution of said linear programming model.

2. A method as defined in claim 1 further comprising the steps of:

constructing a second linear programming model independent of the solution of said first linear programming model and its constraints the solution of which will minimize the cost of energy to produce product over said fixed time horizon; and computing product production levels in terms of product production rate for each energy cost level in a utility contract as combinations of fractions of feasible operating points within the matrix of discrete operating points.

3. A method as defined in claim 2 wherein said products are fluids selected from the class consisting of liquid oxygen, liquid nitrogen, liquid argon and gaseous oxygen, gaseous nitrogen and gaseous argon respectively.

4. A method as defined in claim 3 wherein said products are produced in an air separation plant in which the rate of production of said products and the electrical energy consumed at the plant is monitored and stored as input data for evaluation in comparison with data corresponding to said product production levels to maintain operation of said air separation plant at said computed production levels.

5. A method as defined in claim 4 wherein said first linear programming model is mathematically expressed as follows:

$$\text{Minimize} \sum_{j=1}^{J} C_j Y_{j,cc} \quad (115)$$

$$\text{Subject to: } Y_{j,cc} = \sum_{j=1}^{I} \lambda_i y_{j,i} \text{ for all } j \quad (116)$$

$$x_{m,cc} = \sum_{i=1}^{} \lambda_i x_{m,i} \text{ for all } m \quad (117)$$

$$\sum_{i=1}^{I} \lambda_1 \leq 1.0 \quad (119)$$

$$O \leq \lambda_i \leq 1.0 \text{ for all } i$$

where:
$C_j$—cost placed on process input j
$X_{m,cc}$—known values of process outputs
y—process inputs x—process outputs
c—cost placed on process input
λ—functional weighing factor.

6. A method as defined in claim 5 wherein said production levels for said products is computed as follows:

$$KW_j = \frac{\sum_{i=1} x_{i,j} A_i}{(H_j - XS_j)} \quad (127)$$

$$P_j K = \frac{\sum_{i=1} x_{i,j} PR_{i,k}}{(H_j - XS_j)} \quad (128)$$

$KW_j$ = energy use rate in kilowatt-hours per hour during energy cost level j
$P_{j,k}$—production rate of process product k in units per hour during energy cost level j
$x_{ij}$—activity in hours for operating point i during energy cost level j
A—energy use rate in kilowatt hours per hour for discrete operating point i
$H_j$—number of hours available during energy cost level j
$XS_j$—activity in hours for shutdown
$PR_{ik}$—production rate of process output product K in operating point i.

* * * * *